United States Patent
Mozer et al.

(10) Patent No.: US 8,645,132 B2
(45) Date of Patent: Feb. 4, 2014

(54) TRULY HANDSFREE SPEECH RECOGNITION IN HIGH NOISE ENVIRONMENTS

(75) Inventors: Todd F. Mozer, Los Altos Hills, CA (US); Jeff Rogers, Lake Oswego, OR (US); Pieter J. Vermeulen, Portland, OR (US); Jonathan Shaw, Oregon City, OR (US)

(73) Assignee: Sensory, Inc., Santa Clara, CA (US)

( * ) Notice: Subject to any disclaimer, the term of this patent is extended or adjusted under 35 U.S.C. 154(b) by 118 days.

(21) Appl. No.: 13/217,146

(22) Filed: Aug. 24, 2011

(65) Prior Publication Data

US 2013/0054235 A1    Feb. 28, 2013

(51) Int. Cl.
*G10L 15/20*    (2006.01)
(52) U.S. Cl.
USPC .......................................... 704/233; 704/246
(58) Field of Classification Search
USPC .......................................................... 704/233
See application file for complete search history.

(56) References Cited

U.S. PATENT DOCUMENTS

| | | | |
|---|---|---|---|
| 4,185,167 A * | 1/1980 | Cunningham et al. | 381/73.1 |
| 6,889,189 B2 * | 5/2005 | Boman et al. | 704/270 |
| 7,222,154 B2 * | 5/2007 | Dowling | 709/203 |
| 2005/0114124 A1 * | 5/2005 | Liu et al. | 704/228 |
| 2010/0180754 A1 * | 7/2010 | Brown et al. | 84/610 |
| 2010/0235167 A1 * | 9/2010 | Bourdon | 704/231 |
| 2012/0166183 A1 * | 6/2012 | Suendermann et al. | 704/9 |
| 2012/0293323 A1 * | 11/2012 | Kaib et al. | 340/539.12 |

OTHER PUBLICATIONS

Visser et al (hereinafter Visser), "A spatio-temporal speech enhancement scheme for robust speech recognition in noisy environments", Received Apr. 1, 2002; received in revised form Dec. 1, 2002; accepted Dec. 5, 2002, www.elsevier.com/locate/specom.*

* cited by examiner

*Primary Examiner* — Pierre-Louis Desir
*Assistant Examiner* — Jie Shan
(74) *Attorney, Agent, or Firm* — Fountainhead Law Group, PC

(57) ABSTRACT

Embodiments of the present invention improve content manipulation systems and methods using speech recognition. In one embodiment, the present invention includes a method comprising configuring a recognizer to recognize utterances in the presence of a background audio signal having particular audio characteristics. A composite signal comprising a first audio signal and a spoken utterance of a user is received by the recognizer, where the first audio signal comprises the particular audio characteristics used to configure the recognizer so that the recognizer is desensitized to the first audio signal. The spoke utterance is recognized in the presence of the first audio signal when the spoken utterance is one of the predetermined utterances. An operation is performed on the first audio signal.

22 Claims, 5 Drawing Sheets

TRULY HANDSFREE SPEECH RECOGNITION IN HIGH NOISE ENVIRONMENTS

BACKGROUND

The present invention relates to speech recognition, and more particularly, to systems and methods of operating on audio content based on recognizing spoken utterances in the presence of such audio content.

Traditionally, audio content delivery systems provide limited user interaction with the content being delivered. Radio, for example, plays music to a local speaker, but does not allow a listener to interact or react to the content being delivered. More generally, existing content delivery systems allow the user limited opportunities to interact with the content being received. When interaction is available, it typically requires the use of mechanical input devices such as a keyboard, mouse, or touch screen and the manipulation of user interface elements such as buttons, menus, or windows.

The present invention provides hands-free audio content manipulation systems and methods.

SUMMARY

Embodiments of the present invention improve audio content manipulation systems and methods using speech recognition. Embodiments of the present invention include a method comprising configuring a recognizer to recognize one or more predetermined utterances in the presence of a non-random information bearing background audio signal having particular audio characteristics, said configuring desensitizing the recognizer to signals having said particular audio characteristics, receiving, in the recognizer, a composite signal comprising a first audio signal and a spoken utterance of a user, wherein the first audio signal is generated by an electronic speaker, wherein the first audio signal comprises said particular audio characteristics used to configure the recognizer so that the recognizer is desensitized to the first audio signal, recognizing the spoken utterance in the presence of the first audio signal when the spoken utterance of the user is one of the predetermined utterances, executing a command corresponding to a particular one of the predetermined utterances having been recognized, and performing an operation corresponding to the command on the first audio signal in response to the command.

In one embodiment, the recognizer comprises a phrase spotting algorithm, wherein the recognizer recognizes the predetermined utterances from an ongoing stream of background audio signals, and wherein configuring the recognizer comprises receiving, in the recognizer, training samples comprising the one or more predetermined utterances in the presence of said non-random information bearing background audio signal having said particular audio characteristics, optimizing phrase spotting parameters based on recognition results of the training samples, and configuring the recognizer with said optimized phrase spotting parameters.

In one embodiment, configuring the recognizer further comprises optimizing acoustic models based on recognition results of the training samples and configuring the recognizer with said optimized acoustic models.

In one embodiment, the background audio signal is music and wherein the first audio signal is a song.

In one embodiment, the first audio signal is a song, and the operation manipulates the song according to a spoken command of the user.

In one embodiment, the background audio signal is synthesized speech and wherein the first audio signal is one or more words of the synthesized speech.

In one embodiment, the operation saves the first audio signal for later access by the user.

In one embodiment, the operation associates a preference of the user with the first audio signal.

In one embodiment, the operation shares the first audio signal with other users.

In one embodiment, the operation purchases the first audio signal for the user.

In one embodiment, the operation interrupts the first audio signal and stops it from continuing.

In one embodiment, the operation identifies information about the first audio signal.

In one embodiment, the present invention further comprises, before said configuring, identifying the first audio signal and selecting one of a plurality of recognition sets to recognize said one or more predetermined utterances based on the identified first audio signal. When different audio signals are identified, different recognition sets are dynamically selected and used to configure the recognizer so that the recognizer is desensitized to the identified audio signals.

In another embodiment, the present invention includes an apparatus for performing the techniques described herein. In one embodiment, the present invention include an apparatus comprising a processor, a recognizer, the recognizer being configuring to recognize one or more predetermined utterances in the presence of a non-random information bearing background audio signal having particular audio characteristics to desensitize the recognizer to signals having said particular audio characteristics, and a microphone to receive a composite signal comprising a first audio signal and a spoken utterance of a user, wherein the first audio signal is generated by an electronic speaker, wherein the first audio signal comprises said particular audio characteristics used to configure the recognizer so that the recognizer is desensitized to the first audio signal, wherein the spoken utterance is recognized in the presence of the first audio signal when the spoken utterance of the user is one of the predetermined utterances, wherein a command is executed by said processor corresponding to a particular one of the predetermined utterances having been recognized, and wherein an operation corresponding to the command is performed on the first audio signal in response to the command.

The following detailed description and accompanying drawings provide a better understanding of the nature and advantages of the present invention.

DETAILED DESCRIPTION

Described herein are techniques for a hands-free audio content manipulation systems and methods using speech recognition. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include obvious modifications and equivalents of the features and concepts described herein.

Figure 1:
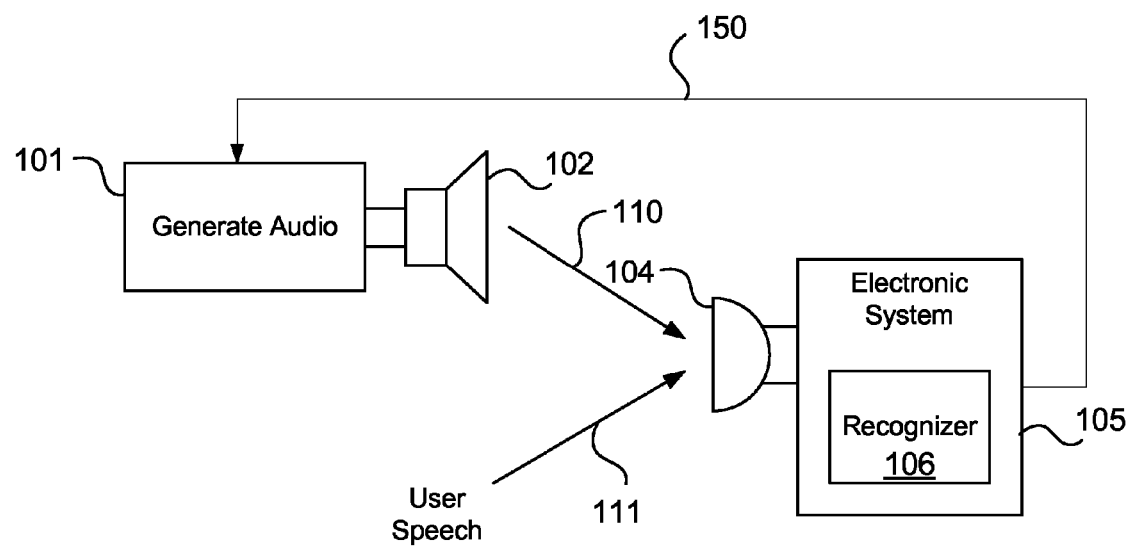
FIG. 1 illustrates a system according to one embodiment of the present invention.

FIG. 1 illustrates a system according to one embodiment of the present invention. In one embodiment, the present invention includes an audio generation component 101 that produces an audio signal 110 through speaker 102. A user may produce a spoken utterance 111 ("User Speech") in the presence of the audio signal 110. A microphone 104 may receive both the audio signal 110 from the electronic speaker 102 and the user's utterance 111. The resulting composite signal is provided to a recognizer 106 in an electronic system 105. Electronic system 105 may be the same system that generates the audio signal 102 or a different system, for example.

Recognizer 106 is configured to recognize predetermined utterances in the presence of a background signal having particular characteristics. For example, recognizer 106 may be configured to recognize words or phrases that act as commands the user might say while listening to audio signal 110. In one embodiment, the audio signal 110 is music, which has particular characteristics. While the user is listening to music, the user may provide a spoken utterance to instruct the system to perform some desired action. In this case, the music is the background signal to the spoken utterance, and the recognizer is configured to recognize particular spoken utterances in the presence of background music. As another example, the audio signal 110 may be synthesized speech, such as text to speech synthesis for an electronic book. In this case, the synthesized speech is the background signal to the spoken utterance, and the recognizer is configured to recognize particular spoken utterances in the presence of background synthesized speech. As described in more detail below, recognizers according to example embodiments may be desensitized to particular background signals having certain specific characteristics (e.g., a priori characteristics), such as music or predetermined synthesized speech, so that the recognizer can effectively word spot command utterances from a user spoken while the background signal is being received.

As mentioned above, the background audio signal 110 and spoken utterance 111 form a composite signal. The composite signal is receive in the speech recognizer 106. Background audio signal 110 comprises the particular characteristics used to configure recognizer 106 so that the recognizer is desensitized to the background audio signal 110. Accordingly, recognizer 106 recognizes a spoken utterance 111 in the presence of the audio signal 110 when the spoken utterance of the user is one of the predetermined utterances. For instance, if the user is listening to a particular song on the radio and the recognizer is configured to recognize the utterance "save that song," then if the user says "save that song" while listening to the radio, the recognizer will recognize the user's spoken utterance in the presence of the background music.

Embodiments of the present invention allow users to manipulate audio content using spoken commands. When a user's utterance is recognized in the presence of an audio signal, the system may execute a command and perform an operation on the audio signal in response to the command as illustrated at 150. For example, if the user is listening to music and says "save that song," a positive recognition result may cause a particular command to be executed corresponding to the particular utterance that is recognized. Here, a command corresponding to "save that song" may be executed. Execution of the particular command may cause the system to perform a save operation, which saves the song being played for the user to access later.

Figure 2:
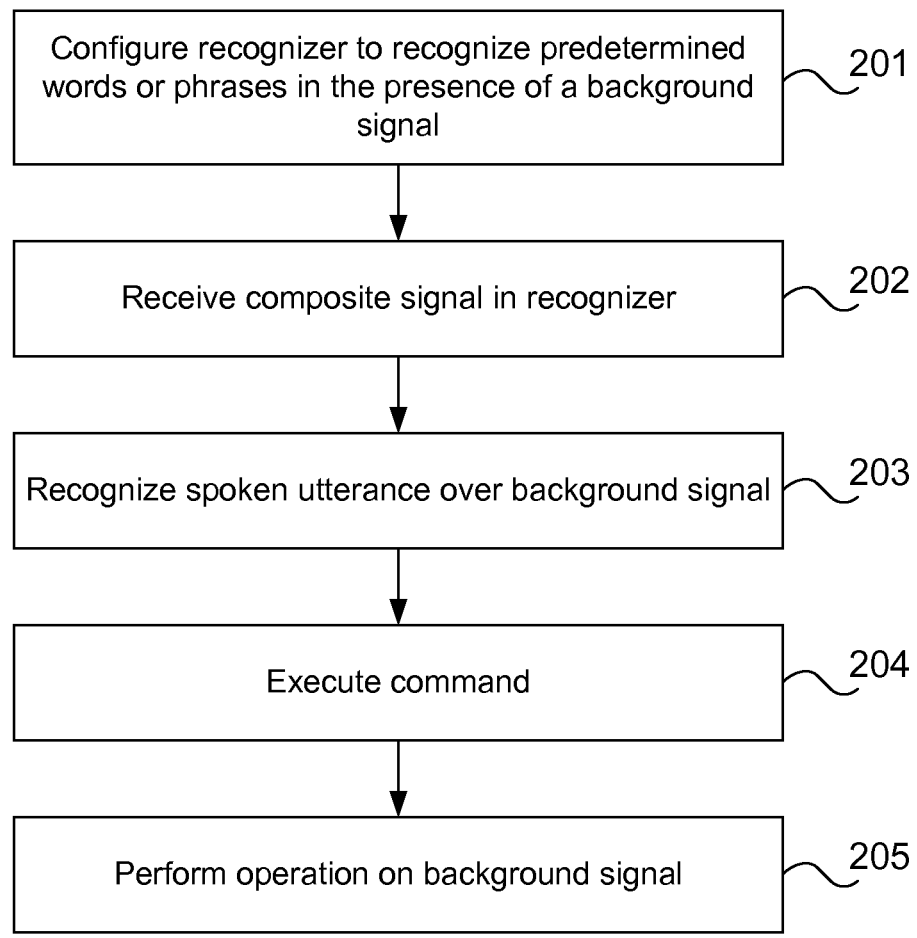
FIG. 2 illustrates a method according to one embodiment of the present invention.

FIG. 2 illustrates a method according to one embodiment of the present invention. At 201, a recognizer is configured to recognize predetermined utterances (e.g., words or phrases) in the presence of a background signal. As mentioned above, the background signal may have certain particular characteristics. At 202, a composite signal is received in the recognizer. The composite signal comprises an audio signal generated by an electronic speaker and a spoken utterance of a user. The audio signal is a background signal to the spoken utterance of the user and comprises the particular characteristics used to configure the recognizer so that the recognizer is desensitized to the audio signal over the spoken utterance. At 203, the spoken utterance is recognized over (i.e., in the presence of) the audio signal when the spoken utterance of the user is one of the predetermined utterances that the recognizer is configured to recognize. At 204, a command correspond to a particular one of the predetermined utterances that was recognized is executed. At 205, the system performs an operation corresponding to the command on the audio signal in response to the command. For example, the user may say "purchase that song," and if "purchase that song" is one of the predetermined utterances, then the recognizer will produce a positive recognition result, causing a command to be executed, which in turn causes the song being played to be purchased by the user. In some embodiments, the operation may interrupt the audio signal and stop it from continuing to play from the speaker. In yet other embodiments, the operation may identify information about the audio signal, such as the name of the band, title, or any other information about the signal being played.

Figure 3:
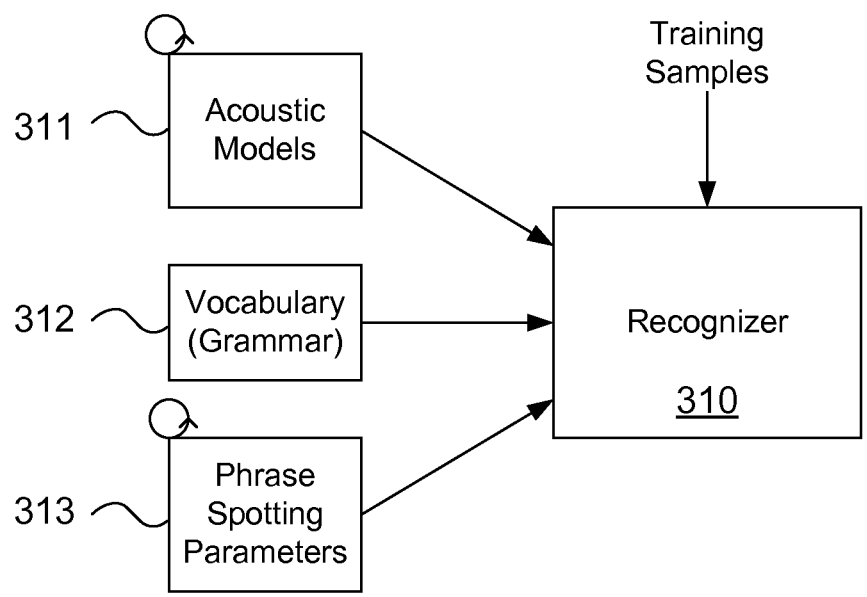
FIG. 3 is an example of configuring the recognizer according to one embodiment of the present invention.

FIG. 3 is an example of configuring the recognizer 310 according to one embodiment of the present invention. Example embodiments of the present invention include configuring the recognizer to be desensitized to particular background signals, such as music, synthesized speech, or other sounds having predictable characteristics. The background signals referred to herein are to be distinguished from noise. Embodiments of the present invention allow words or phrases to be recognized in the presence of non-random information bearing background signals such as music or synthesized speech, which is different from noise at least because noise is typically random (i.e., truly random or pseudo-random) and does not carry information. For example, recognizer 310 may be configured to perform recognition operations using acoustic models 311, a vocabulary 312, and phrase (word) spotting parameters 313. Vocabulary 312, sometimes referred to as a grammar or recognition set, are the predetermined utterances (e.g., words or phrases) that the recognizer is configured to recognize. Example acoustic models may include probabilities corresponding to particular components of sound, such as phonemes or sub-phones. For example, given an input sound, an acoustic model may produce a probability that the input sound is a particular sound component (e.g., a sub-phone) the recognizer is configured to recognize. In other words, for a frame of features, an acoustic model may provide the probability that the input frame represents a particular sound. Example implementations of acoustic models include neural networks and Gaussian Mixture Models. Example embodiments of the present invention may include phase spotting parameters to implement a phrase spotting (or word spotting) algorithm for detecting particular sounds from an ongoing stream of sounds. The term "phrase spotting" and "word spotting" are used interchangeably herein. One example phrase (word) spotting algorithm that may be used to configure recognizer 310 is disclosed in commonly owned U.S. patent application Ser. No. 12/831,051 filed Jul. 6, 2010 entitled SYSTEMS AND METHODS FOR HANDS-FREE VOICE CONTROL AND VOICE SEARCH, the contents of which are hereby incorporated herein by reference.

In one embodiment, a recognizer is listening for particular phrases or words in a vocabulary. Phrase spotting parameters 313 may be optimized for particular background audio signals having particular characteristics by iteratively adjusting the parameters as the vocabulary, in the form of training audio samples, is input to the recognizer in the presence of the background signal. For example, if a recognizer is listening for particular spoken utterances (commands in the recognizer's vocabulary) in the presence of music, the phrase spotting parameters may be optimized by repeatedly providing audio training samples into the recognizer, where the audio training samples comprise the command words/phrases in the vocabulary in the presence of an audio background signal having the same characteristics as music. Final parameters may be obtained when the recognition results are optimized. Similarly, acoustic models 311 should be invariant to the characteristics of a particular background. If the acoustic models are not sufficiently invariant for a particular background audio signal, then the background may be characterized and built into training samples to allow the acoustic models to learn (adapt) to be more invariant for the particular background.

Figure 4:
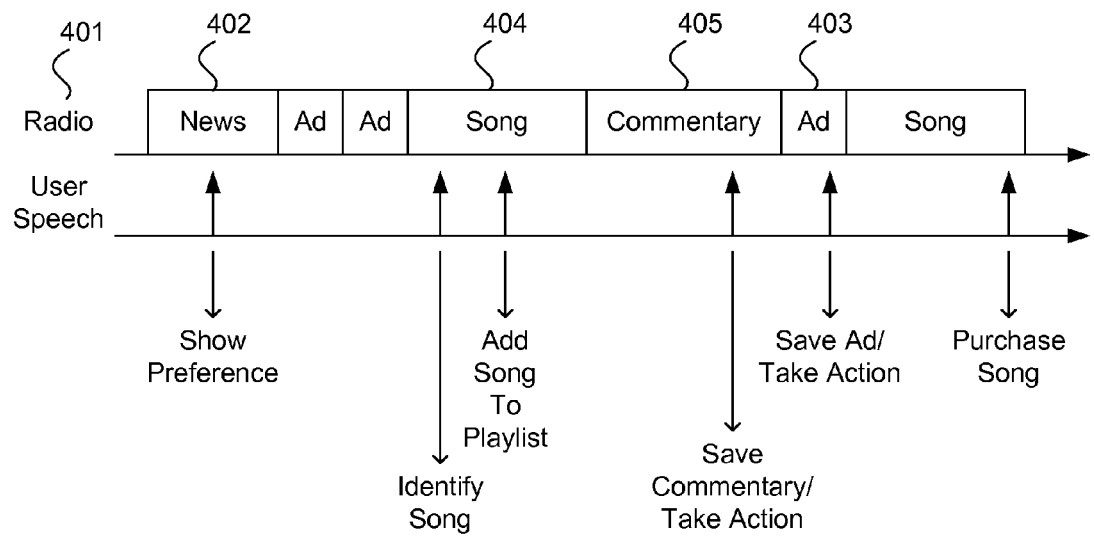
FIG. 4 illustrates another embodiment of the present invention.

FIG. 4 illustrates another embodiment of the present invention. In this example, a recognizer is "always on and always listening," which means that, during system operation, the recognizer receives a stream of input signals (e.g., background music) and spots utterances in the recognizer's vocabulary. For instance, an electronic speaker may generate audio from a radio station, which may be either an Internet radio station or a broadcast radio station. The radio audio signal 401 may include News 402, Advertisements ("Ad") 403, Songs 404, or Commentary 405. A recognizer may be configured to recognize spoken utterances in the presences of one or more of these different types of audio signals having different characteristics. For example, if the recognizer is configured to recognize spoken utterances in the presence of a News audio signal 402 (e.g., from a known news source), a user may be listening to the News audio signal 402 and show a preference by saying "I like this" (or "I don't like this"). When the user's preference is recognized, the system may issue a command that causes a "like" (or "dislike") operation to be performed on the particular News audio signal 402. For example, the system may associate the user's preference with the News audio signal 402 and indicate that the user "Liked" (or "Disliked") the News audio signal 402 to others (e.g., in a social network). Alternatively, a user may share the News by saying "Share This," which may post the News audio signal to a social network, such as Facebook®, for example.

Similarly, if the recognizer is configured to recognize spoken utterances in the presence of a Song audio signal 404, a user may be listening to a particular Song 404 and manipulate the song. For example, the user may hear a new song and say "Identify Song," which may cause the system to perform an identification operation on Song 404. As another example, the user may say "Add Song to Playlist," which may add the currently playing song to a user's playlist. As yet another example, the user may say "Purchase Song," which may cause the system to perform a financial transaction that allows the user to purchase rights to the currently playing song.

As yet another example of voice controlled content manipulation, if the recognizer is configured to recognize spoken utterances in the presence of a Commentary audio signal 405 (e.g., from known DJs on a radio station), a user may be listening to a particular Commentary 405 and the user may say "Save Commentary," which may cause the system to perform a save operation on the commentary. The user may provide a spoken utterance to perform a variety of other actions as well, such as posting Commentary to Facebook, forwarding Commentary to a particular person, etc. . . . . . Likewise, as yet another example, if the recognizer is configured to recognize spoken utterances in the presence of Advertisement audio signal 403 (e.g., from known advertising source), a user may be listening to a particular Ad 403 and the user may say "Save Ad," which may cause the system to perform a save operation on the advertisement. In another embodiment, if the advertisement is an offer to purchase, the user may say "Buy Now," for example, causing a financial transaction to be performed all in a hands-free mode.

In one embodiment, the present invention further comprises, before said configuring, identifying the first audio signal and selecting one of a plurality of recognition sets to recognize said one or more predetermined utterances based on the identified first audio signal. When different audio signals are identified, different recognition sets are dynamically selected and used to configure the recognizer so that the recognizer is desensitized to the identified audio signals. For example, the system may identify an audio signal and apply one of a set of several pre-trained recognition sets that are trained to work in the presence of such audio signals. When the audio signals change the system may call up a new set of recognition commands trained to perform in the presence of the new audio signal, such that the recognition vocabularies dynamically change with the variances in background audio. As an example, the system may identify "News" audio signal 402 and apply a particular recognition set that is trained to work in the presence of "News" audio signal 402, for example. As another example, the system may identify a particular advertisement and dynamically change the recognition set to work in the presence of the advertisement, for example. Further, different commands may be associated with different audio signals as illustrated in FIG. 4.

Figure 5:
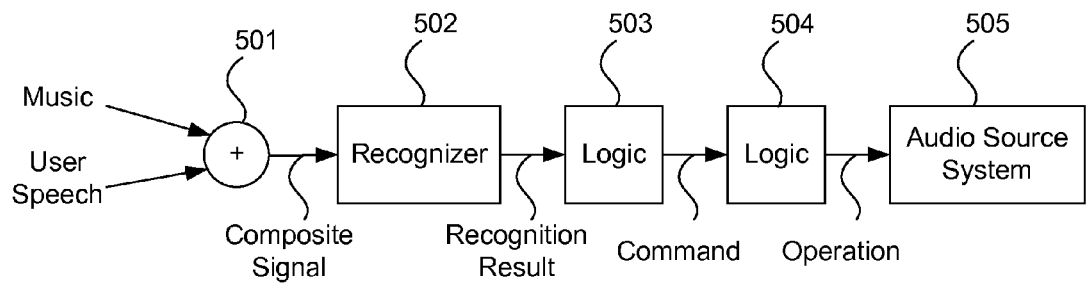
FIG. 5 illustrates an example process flow for voice controlled content manipulation according to another embodiment of the present invention.

FIG. 5 illustrates an example process flow for voice controlled content manipulation according to another embodiment of the present invention. In this example, music and a user's speech are combined at 501 (e.g., in a microphone). The output is a composite signal. The composite signal may be digitized, for example, and provided to recognizer 502. Recognizer 502 may recognize spoken utterances in the composite signal when a user speaks one of the words or phrases in the recognizer's recognition set (vocabulary). When a spoken utterance is recognized, recognizer 502 generates a recognition result. The recognition result may be provided to logic 503, which may interpret the result as a positive recognition (e.g., a likelihood above some threshold) and generate a particular command. Different recognition results may trigger different commands, for example. The command, in turn, is provided to logic 504 to cause an operation to be performed. The operation may operate on the system sourcing the audio signal (e.g., the source of the music). It is to be understood that the recognizer 502, logic 503, and logic 504 may be implemented in hardware or software or as various combinations of hardware and software. For example, the recognizer may be executing on a microprocessor or microcontroller, and logic 503 and/or 504 may be program code executable on the same or a different microprocessor or microcontroller.

Figure 6:
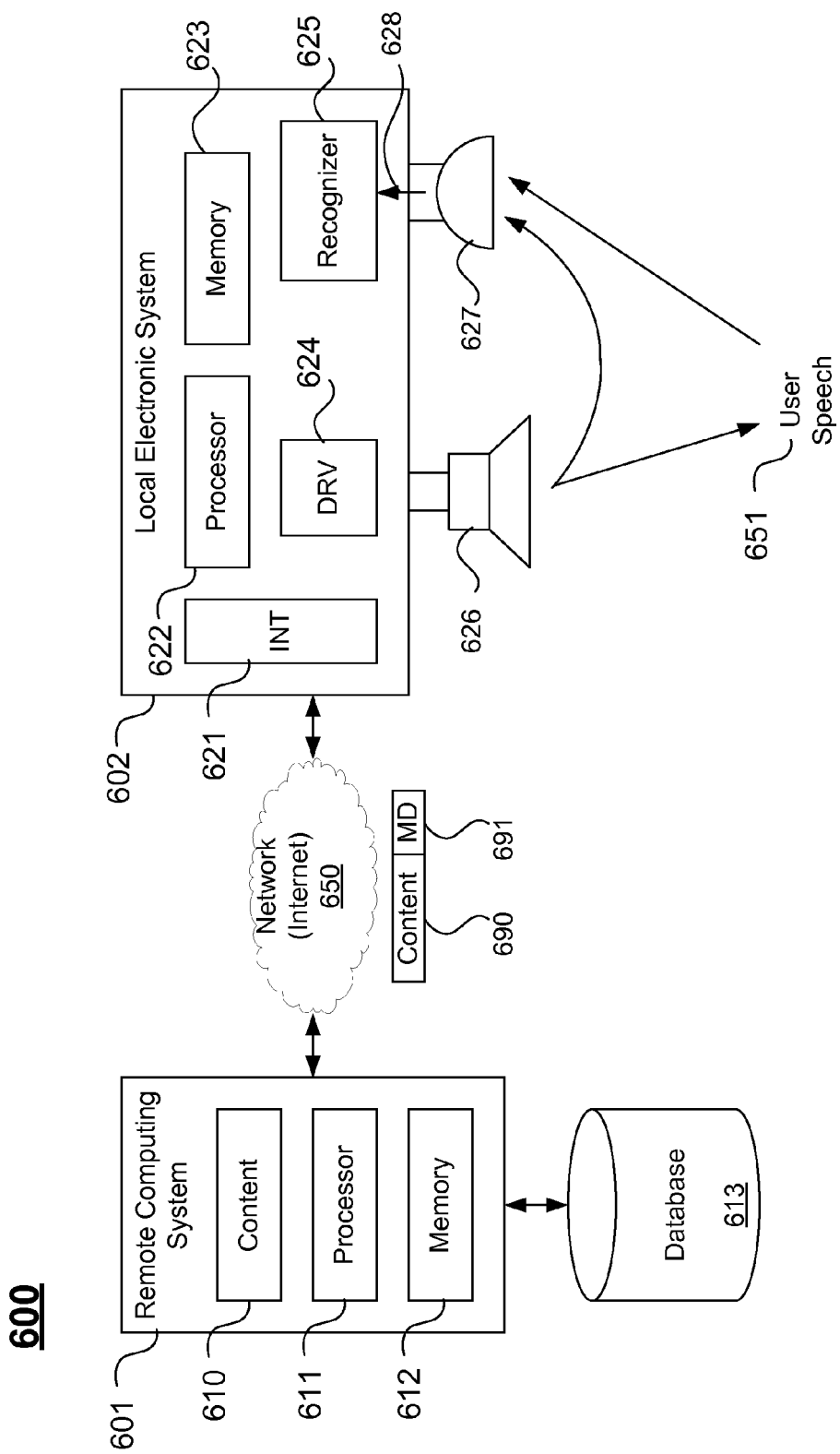
FIG. 6 illustrates an example application according to one embodiment of the present invention.

FIG. 6 illustrates an example application 600 according to one embodiment of the present invention. In this example, a user may manipulate content on a remote computing system 601 using voice commands uttered while listening to music from the remote computing system (e.g., a radio station). For instance, remote computing system 601 may include content (e.g., music) 610, one or more processors 611, and memory 612. Content may be accessed from a database 613 and sent across a network 650 to a local electronic system 602, for example. In this example, content 610 includes audio streamed to the local electronic system 602. The streaming audio may be from an Internet radio station or from a broadcast radio station. Content may be sent over the network as content 690 and metadata 691. Metadata 691 describes the content to the local electronic system 602. For example, metadata 691 may describe the name of a band and/or song or provide other information such as the purchase price to buy the song. Content is received in local electronic system 602 via an interface ("INT") 621. Interface 621 may be an Internet network interface or a wireless interface, for example, depending on the network being used to stream the audio.

Local electronic system 602 may include one or more processors 622, memory 623, an audio driver 624, and recognizer 625. The streaming audio is played through driver 624 and an electronic speaker 626. As described above, a user may listen to the audio and manipulate the streaming audio using voice commands. For example, a user may be listening to a song and provide a spoken utterance such as "Save song to playlist." The user's speech 651 and the streaming audio from speaker 626 are both received in microphone 627 of local electronic system 602. The streaming audio (e.g., the song) and the user's speech are combined to form a composite signal 628. As described above, the composite signal 628 is received by a recognizer 625, which has been configured to be desensitized to music, for example. If the words "Save song to playlist" are in the recognizer's vocabulary, then the recognizer generates a positive recognition result, which triggers a particular command, for example, in processor 622. In response to the command, processor 622 may signal remote computing system 601 to save the song to the particular user's playlist. For example, the local electronic system 602 may send metadata 691 to the remote computing system 601 to identify which song to add to the playlist.

In one embodiment, in response to some commands, such as a "save to playlist" command, the system may trigger a dialog with the user. For example, the system may generate synthesized audio to determine more information about the user or about what the user wants to do. For example, if the user is listening to an Internet radio station where the user has an account and multiple playlists, the system may prompt the user for account logic information and or information specifying a particular playlist. In this example, recognizer 625 may be configured to recognize additional utterances to allow the user to provide further information to the system (e.g., digits or letters to spell out account names or passwords). As another example, if the user expresses a preference (e.g., by saying "I like this song") the system may prompt the user with "This is Money by Pink Floyd. Would you like to buy this song?"

While the above system is described in terms of remote computing systems and local computing systems, it is to be understood that various embodiments of the present invention may be implemented in a variety of systems. For example, in one embodiment, audio signals are generated in a cloud computer system and the local device may be a computer, an embedded device (e.g., in a car), or a variety of mobile devices with voice recognition capability. In other embodiments, the local device may only send and receive audio signals and the recognizer may be on the remote computing system, such as a cloud system. In one embodiment, the local electronic system is a mobile phone and the operation performed is a download of a song from a remote database to the local device, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims. The terms and expressions that have been employed here are used to describe the various embodiments and examples. These terms and expressions are not to be construed as excluding equivalents of the features shown and described, or portions thereof, it being recognized that various modifications are possible within the scope of the appended claims.

What is claimed is:

1. A method comprising:
   receiving a first audio signal;
   identifying the first audio signal;
   selecting one of a plurality of recognition sets to recognize one or more predetermined utterances based on the identified first audio signal;
   configuring a recognizer to recognize the one or more predetermined utterances in the presence of a non-random information bearing background audio signal having particular audio characteristics, said configuring desensitizing the recognizer to signals having said particular audio characteristics;
   receiving, in the recognizer, a composite signal comprising the first audio signal and a spoken utterance of a user, wherein the first audio signal is generated by an electronic speaker, wherein the first audio signal comprises said particular audio characteristics used to configure the recognizer so that the recognizer is desensitized to the first audio signal;
   recognizing the spoken utterance in the presence of the first audio signal when the spoken utterance of the user is one of the predetermined utterances;
   executing a command corresponding to a particular one of the predetermined utterances having been recognized; and
   performing an operation corresponding to the command on the first audio signal in response to the command,
   wherein when different audio signals are identified, different recognition sets are dynamically selected and used to configure the recognizer so that the recognizer is desensitized to the identified audio signals, and wherein the different audio signals are associated with different commands executed when an utterance is recognized.

2. The method of claim 1 wherein the recognizer comprises a phrase spotting algorithm, wherein the recognizer recognizes the predetermined utterances from an ongoing stream of background audio signals, and wherein configuring the recognizer comprises:
   receiving, in the recognizer, training samples comprising the one or more predetermined utterances in the presence of said non-random information bearing background audio signal having said particular audio characteristics;
   optimizing phrase spotting parameters based on recognition results of the training samples; and configuring the recognizer with said optimized phrase spotting parameters.

3. The method of claim 2 wherein configuring the recognizer further comprises:
optimizing acoustic models based on recognition results of the training samples; and
configuring the recognizer with said optimized acoustic models.

4. The method of claim 1 wherein the background audio signal is music and wherein the first audio signal is a song.

5. The method of claim 1 wherein the first audio signal is a song and wherein the operation manipulates the song according to a spoken command of the user.

6. The method of claim 1 wherein the background audio signal is synthesized speech and wherein the first audio signal is one or more words of the synthesized speech.

7. The method of claim 1 wherein the operation saves the first audio signal for later access by the user.

8. The method of claim 1 wherein the operation associates a preference of the user with the first audio signal.

9. The method of claim 1 wherein the operation shares the first audio signal with other users.

10. The method of claim 1 wherein the operation purchases the first audio signal for the user.

11. The method of claim 1 wherein the operation identifies information about the first audio signal.

12. The method of claim 1 wherein the operation interrupts the first audio signal and stops it from continuing.

13. An apparatus comprising:
a processor;
a recognizer, the recognizer configured to recognize one or more predetermined utterances in the presence of a non-random information bearing background audio signal having particular audio characteristics to desensitize the recognizer to signals having said particular audio characteristics;
and a microphone to receive a composite signal comprising a first audio signal and a spoken utterance of a user, wherein the first audio signal is generated by an electronic speaker, wherein the first audio signal comprises said particular audio characteristics used to configure the recognizer so that the recognizer is desensitized to the first audio signal, wherein the spoken utterance is recognized in the presence of the first audio signal when the spoken utterance of the user is one of the predetermined utterances, wherein a command is executed by said processor corresponding to a particular one of the predetermined utterances having been recognized; and wherein an operation corresponding to the command is performed on the first audio signal in response to the command, wherein, before configuring the recognizer, the first audio signal is identified, and wherein one of a plurality of recognition sets is selected to recognize said one or more predetermined utterances based on the identified first audio signal, and wherein when different audio signals are identified, different recognition sets are dynamically selected and used to configure the recognizer so that the recognizer is desensitized to the identified audio signals, and wherein the different audio signals are associated with different commands executed when an utterance is recognized.

14. The apparatus of claim 13 wherein the recognizer comprises a phrase spotting algorithm, wherein the recognizer recognizes the predetermined utterances from an ongoing stream of background audio signals, and wherein configuring the recognizer comprises:
receiving, in the recognizer, training samples comprising the one or more predetermined utterances in the presence of said non-random information bearing background audio signal having said particular audio characteristics;
optimizing phrase spotting parameters based on recognition results of the training samples; and
configuring the recognizer with said optimized phrase spotting parameters.

15. The apparatus of claim 14 wherein configuring the recognizer further comprises:
optimizing acoustic models based on recognition results of the training samples; and
configuring the recognizer with said optimized acoustic models.

16. The apparatus of claim 13 wherein the operation saves the first audio signal for later access by the user.

17. The apparatus of claim 13 wherein the operation associates a preference of the user with the first audio signal.

18. The apparatus of claim 13 wherein the operation shares the first audio signal with other users.

19. The apparatus of claim 13 wherein the operation purchases the first audio signal for the user.

20. The apparatus of claim 13 wherein the apparatus comprises one of a mobile phone, a tablet computer, and an electronic reader.

21. The apparatus of claim 13 wherein the recognizer is operable on said processor.

22. The apparatus of claim 13 wherein the processor is a first electronic circuit and the recognizer is a second electronic circuit.

* * * * *